United States Patent [19]

Arenas et al.

[11] Patent Number: 4,544,078

[45] Date of Patent: Oct. 1, 1985

[54] SEALED CLOSURE FOR SEALING AND CLOSING AN OPENING IN A CONTAINER

[75] Inventors: Alvaro Arenas; John W. Box, both of Miami; Joseph H. Davis, Miami Lakes; Harshad Tataria, Miami, all of Fla.

[73] Assignee: Cordis Corporation, Miami, Fla.

[21] Appl. No.: 613,048

[22] Filed: May 22, 1984

[51] Int. Cl.⁴ .................................................. B65D 51/18
[52] U.S. Cl. .................................... 220/256; 220/364; 429/101; 429/181; 429/165; 429/174
[58] Field of Search ............... 220/256, 364; 136/133, 136/6, 6 LN, 166, 111; 429/56, 165, 101, 623, 170, 181, 630 R, 174

[56] References Cited

U.S. PATENT DOCUMENTS

| | | |
|---|---|---|
| 1,376,905 | 5/1921 | Sturges . |
| 2,144,959 | 1/1939 | Blackburn ............................ 175/315 |
| 3,042,734 | 7/1962 | Carmichael et al. ................ 136/133 |
| 3,184,342 | 5/1965 | Seibel .................................... 136/166 |
| 3,380,857 | 4/1968 | Bilhorn ................................. 136/133 |
| 3,416,964 | 12/1968 | Michalko ................................. 136/6 |
| 3,421,945 | 1/1969 | Michalko ................................. 136/6 |
| 3,457,117 | 7/1969 | Angelovich .......................... 136/133 |
| 3,556,848 | 1/1971 | Ruetschi ................................. 136/6 |
| 3,804,671 | 4/1974 | Rosansky .......................... 136/6 LN |
| 3,809,580 | 5/1974 | Jagid .................................... 136/133 |
| 3,928,077 | 12/1975 | Sperandio et al. ................... 136/111 |
| 4,047,292 | 9/1977 | Shaffer .............................. 29/630 R |
| 4,048,401 | 9/1977 | Epstein et al. ........................ 429/171 |
| 4,174,424 | 11/1979 | Jurva et al. ............................ 429/90 |
| 4,182,028 | 1/1980 | Epstein et al. .......................... 29/623 |
| 4,215,187 | 7/1980 | Gnida et al. .......................... 429/161 |
| 4,329,405 | 5/1982 | Zupancic ................................. 429/56 |
| 4,478,788 | 10/1984 | Rozmus et al. ...................... 220/256 |

Primary Examiner—George T. Hall
Attorney, Agent, or Firm—Henry W. Collins; Thomas R. Vigil

[57] ABSTRACT

The method for closing and sealing the opening of a wall of a container includes the steps of: providing the opening with a counterbore; inserting a first plug member into said opening in a fluid tight manner to establish a first seal; inserting a second plug member into said counterbore and above said first plug member and said opening; and fixing and sealing said second plug member to said wall around said counterbore so that a fluid tight second seal is formed between said second plug member and said wall thereby to provide a double seal for preventing leakage of fluid material from said container through said opening.

The fluid tight closure assembly is adapted to provide a fluid tight closure for closing and sealing the opening in the wall of the container having fluid material therein. The closure assembly includes a first plug member which is inserted into the opening in the wall of the container in a fluid tight manner to establish a first seal, the opening being provided with a counterbore. The plug assembly further includes a second plug member which is adapted to be inserted into the counterbore above the first plug member and the opening. The second plug member is permanently fixed to the wall around the counterbore in a fluid tight manner so that a fluid tight second seal is formed between the second plug member and the wall thereby to provide a double seal for preventing leakage of fluid material from the container through the opening.

24 Claims, 3 Drawing Figures

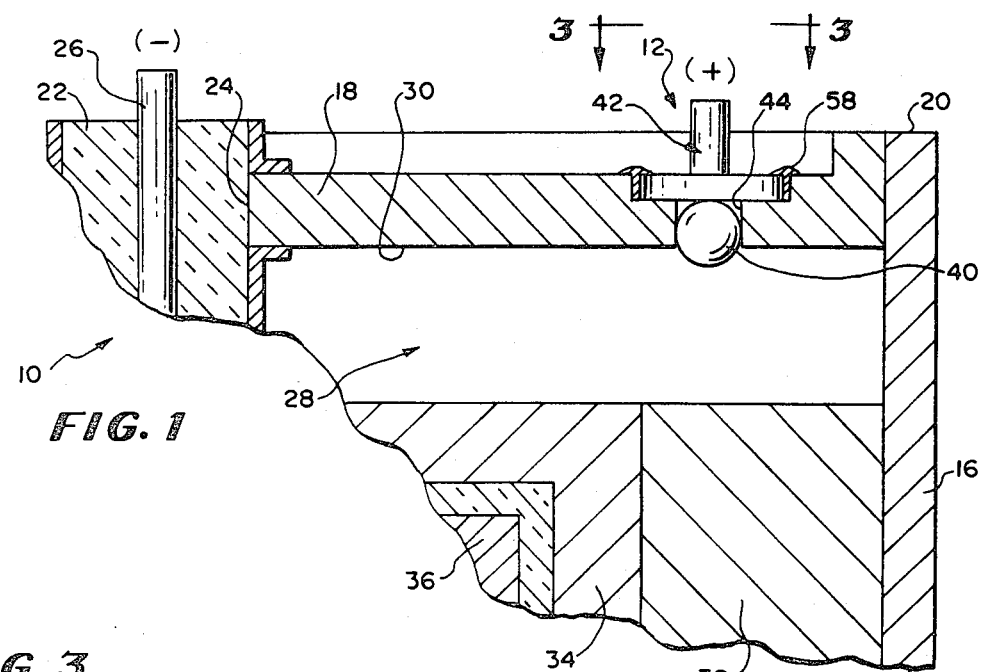
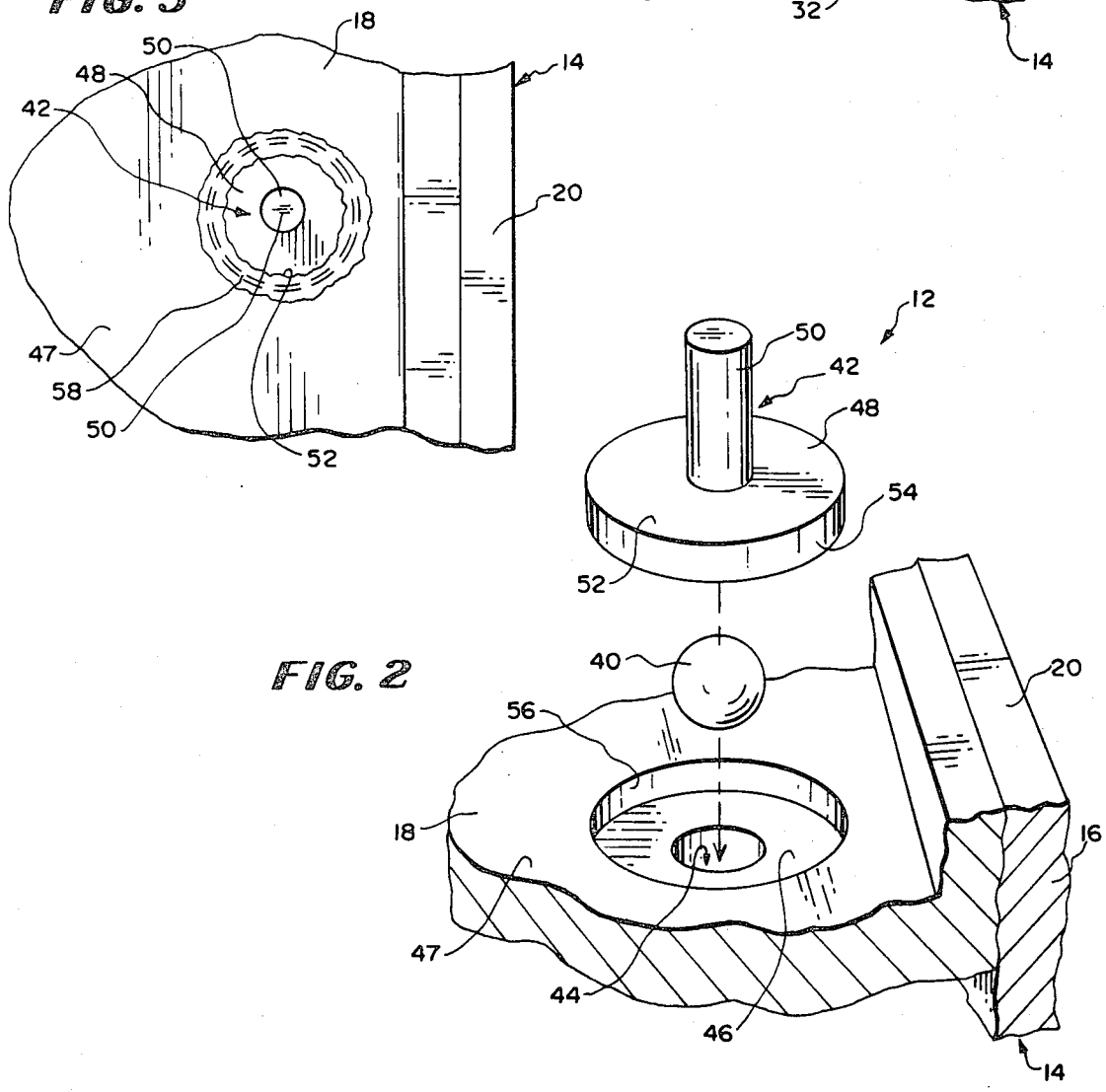

SEALED CLOSURE FOR SEALING AND CLOSING AN OPENING IN A CONTAINER

BACKGROUND OF THE INVENTION

1. Field of the Invention

The present invention relates to a method for closing and sealing an opening in a container. The sealed closure includes a first plug member and a second plug member which are adapted to provide a double seal in a countersunk opening or hole in the container in order to prevent leakage of fluid from the container such as a housing for an electrolytic cell.

2. Description of the Prior Art

Heretofore, various devices and methods have been proposed for sealing or otherwise closing a battery cell housing or containers, such as for capacitors adapted to store fluid material therein. Examples of such previously proposed methods and devices are disclosed in the following U.S. Pat. Nos.:

1,376,905 Sturges;
2,144,959 Blackburn;
3,042,734 Carmichael et al.;
3,184,342 Seibel;
3,380,857 Bilhorn;
3,416,964 Michalko;
3,421,945 Michalko;
3,457,117 Angelovich;
3,556,848 Ruetschi;
3,804,671 Rosansky;
3,809,580 Jagid;
3,928,077 Sperandio et al.;
4,047,292 Shaffer;
4,048,401 Epstein et al.;
4,174,424 Jurva et al.;
4,182,028 Epstein et al.;
4,215,187 Gnida et al;
4,329,405 Zupancic.

The Sturges U.S. Pat. No. 1,376,905 discloses a seal for storage batteries adapted to form a seal between the battery lid or cover and a terminal post or battery electrode extending through a hole in the battery lid. The battery lid is provided with three necks integral with the battery lid, two of which encircle a battery post which extends through each of the two necks. Each of the two necks are threaded externally and a rubber gasket rests upon an upper surface of each of the two necks and each gasket is clamped firmly thereon by an internally threaded sealing ring which fits around the threaded necks. The sealing rings are then screwed down tightly thereby to make a fluid tight fit, and the sealing rings soldered directly to the terminal posts.

The Blackburn U.S. Pat. No. 2,144,959 discloses a method for constructing a condensor having an open end which is closed by a composite cap comprising three discs. An inner disc made of a rubber material is interposed between two rigid outer discs made of an insulating material. The three discs forming the composite cap are inserted through an open end of the condensor having a neck with a constricted bead portion so that when the composite cap is pressed against the constricted bead portion of the neck, the pressure exerted by the two other discs on the rubber inner disc causes the rubber inner disc to expand against the inside wall of the condensor thereby to effectively seal the condensor.

The Carmichael et al U.S. Pat. No. 3,042,734 discloses an alkaline cell closure comprising a cover, a tapered metallic flanged terminal, and an annular U-shaped seal gasket. The terminal is radially sealed by drawing the terminal through a central aperture in the sealed gasket, the aperture having a smaller diameter than the terminal, so that when the terminal is driven through the aperture in the gasket, the sealed gasket is radially compressed between the cover and the terminal. The sealed members of the cell closure are then positioned in the open end of an open top container and radially compressed therein to establish a fluid tight seal.

The Seibel U.S. Pat. No. 3,184,342 discloses gas tight casings for power sources or other types of electrochemical cells which include a cup made of two metal pieces wherein a circular bottom member is welded to a bottom opening of a cylindrical tube in order to provide a lower hermetical seal. Once the constituents of an electrochemical power source have been assembled within the cup formed by the cylindrical tube and the lower bottom member, a circular cover member is welded to an upper opening of the cup thereby to provide an upper hermetical seal.

The Bilhorn U.S. Pat. No. 3,380,857 discloses a hermetic seal closure having an inner metallic terminal member, an outer metallic rim member and a glass insulating member separating the terminal member and the rim member. The terminal member includes an upwardly projecting center portion which passes through a hole in the center of the insulating member and an outwardly projecting flange. The rim member includes a peripheral V-shape bend which further includes an inner edge comprising an inwardly extending flange so that the V-shape bend abuts the side of the insulating member and the flange of the bend overlaps an upper surface of the insulating member when the rim is placed over the insulating member. The closure is formed by inserting the center portion of the terminal through the center of the insulating member so that the flange of the terminal overlaps a lower surface of the insulating member. Then, the rim member is placed over the terminal and insulating member. In order to radially compress the insulating member so that after the closure is welded to the open end of a container, the outer edge of the rim member is firmly anchored to the container. As pressures build up within the sealed container, such as by gas evolution, a force is exerted against the underside of the closure which causes the insulating member to be placed under axial compression in addition to the radial compression in order to provide a hermetic seal closure.

The Michalko U.S. Pat. No. 3,416,964 discloses a fusion sealed, metal enclosed, rechargable battery cell having a multiple member sealing assembly comprising a ceramic collar having a central opening interposed between two glass fusion seals, each of which also having a central opening. The ceramic collar has two spaced metallic coatings affixed with tight metallic fusion joints to a surrounding battery casing. The battery cell includes an integral cover which includes a centrally disposed circular aperture through which a tubular metal terminal member extends and which defines a sealing region which accommodates the sealing assembly. The cover further includes a shoulder which extends inwardly into the aperture and the ceramic collar is interposed between the circumferential edge of the shoulder and the glass fusion seals are positioned above and below the ceramic collar and overlap the respective upper and lower surfaces of the ceramic collar and the upper and lower surfaces of the shoulder. The outer circumferential edge of the ceramic collar is metallically coated and joined by a metallic junction layer to the circumferential edge of the shoulder, and the inner circumferential edge of the collar also being metallically coated and formed by a metallic junction layer to the terminal member which extends therethrough. The glass fusion seals are then fused above and below the ceramic collar and shoulder by heating in order to complete a gas tight seal.

The Michalko U.S. Pat. No. 3,421,945 discloses a fusion sealed, metal enclosed, rechargable battery cell having a seal around a terminal member comprising an alkaline resistant ceramic collar joined to the adjacent metal surfaces of the terminal and the battery cell casing by metallic fusion seals. A protective solidified molten glass seal is interposed between the metallic fusion seals and the battery cell interior for protecting the metal fusion seals from electrolyte penetration.

The Angelovich U.S. Pat. No. 3,457,117 discloses a leakproof electrochemical cell having a top closure comprising a pair of nested top discs with an inner disc inserted therebetween, all of which are welded together. The top closure including an elastomeric grommet is inserted into an opening of a cylindrical metal can. A portion of the metal can is crimped down over the grommet so that it is strongly compressed between the crimped portion of the metal can and an inner flange of the can thereby sealing the cell.

The Ruetschi U.S. Pat. No. 3,556,848 discloses a hermetically sealed enclosure for a battery cell including a synthetic plastic ring member which is supported by an internal shoulder machined into a battery cell can. The shoulder includes a sharp edge that engages into the plastic ring member when the can edge is crimped over the ring member so that the ring is permanently pressed against the can edge, thereby to provide a seal to the cell.

The Rosansky U.S. Pat. No. 3,804,671 discloses a non-aqueous battery construction and method of sealing same by cold welding. The battery includes a casing having a battery top disposed across the open end of a casing with an upstanding tube-like portion extending therefrom. An annular insert is disposed within the tube-like projection so that after a liquid material is poured through the tube-like projection, the battery top is pinched along a plane projecting radially through the tube-like projection and the annular insert thereby forming a cold weld in order to hermetically seal the battery.

The Jagid U.S. Pat. No. 3,809,580 discloses a battery sealing and component connecting method for hermetically sealing a battery cell which includes a constricted neck portion in a metal cannister a distance below the opening of the cannister. A thrust ring, an insulating member, and a metal cap are inserted into the opening and rest upon the constricted neck portion so that when the open end is then uniformly upset or crimped to bear upon the insulating member and the cap, the cannister is thereby hermetically sealed.

The Sperandio et al U.S. Pat. No. 3,928,077 discloses a housing for an electrochemical cell comprising a cup-shaped casing and a lid member which is welded to the cup on the peripheral rim of the cup which the lid member overlaps. A terminal member is connected to a positive electrode within the casing through a hole in the wall of the casing. The terminal member is screwed into a nut-like metal part which is situated within the metal casing adjacent the hole and insulated from the casing by a protective sleeve-like member which surrounds the nut-like member. The terminal member is insulated from the metal casing by a seal which is located between a head portion of the terminal member on the outside of the casing and the wall of the casing.

The Shaffer U.S. Pat. No. 4,047,292 discloses a process for forming an electrical insulating seal between a metal lead and a metal cover having an aperture. A metal terminal lead is centrally located within the aperture and is maintained therein by a glass seal. The glass seal has a thermal coefficient of expansion equal to that of the metal cover so that when the assembly is heated for sufficient time, the glass is melted to form a seal.

The Epstein et al U.S. Pat. No. 4,048,401 discloses a hermetically sealed primary electrochemical cell and a method for its production. A hermetic seal is provided by welding a glass-to-metal seal within a single opening in the outer casing of the primary electrochemical cell which casing forms are terminal of the cell. Once an electrochemical system is disposed within the outer cell casing of the electrochemical cell, a plastic washer is disposed above the electrochemical materials in sealing contact with the internal wall of the outer cell casing. Above the plastic washer, the glass-to-metal seal protrudes inwardly toward the electrochemical materials and engages a hole in the plastic washer so as to form a complete temporary seal across the cell casing immediately above the electrochemical materials. A glass sleeve is located within a central portion of the seal and a solid metallic feedthrough extends therethrough and has its internal end mechanically and electrically engaged with a cathode current collector within the housing. The external end of the metallic feedthrough serves as a second terminal for the electrochemical cell. A weld is formed at the outer rim of the glass-to-metal seal where the glass-to-metal seal engages with an opening in the outer cell casing in order to provide a hermetic seal.

The Jurva et al U.S. Pat. No. 4,174,424 discloses a seal arrangement for facilitating testing of hermeticity leakage. The seal arrangement includes an inner plug which is press fitted or interference fitted into an opening of a battery container, the inner plug being preferably composed of polytetrafluoroethylene. The opening includes a cylindrical side wall against which the inner plug may be pressed in sealing engagement, although the seal formed therebetween is not hermetic. The hermetic seal is provided by an outer cover member which is spaced above the inner plug and which is welded to the side wall of the opening.

The Epstein et al U.S. Pat. No. 4,182,028 discloses a hermetically sealed button-type electrochemical cell and method for making same wherein the electrochemical cell includes a first generally dish-shaped housing member and a second housing member which is substantially a flat cover. The face of the cover includes a hole containing a glass-to-metal seal through which a solid terminal structure extends. The method of establishing the glass-to-metal seal includes the placing of a generally annular glass bead within the hole of the cover and inserting the terminal structure through a central bead opening. The glass bead is then fused, and the glass-to-metal seal formed, by subjecting the assembly to high temperatures, thereby to electrically insulate the terminal from the cover and hermetically seal the hole.

The Gnida et al U.S. Pat. No. 4,215,187 discloses a gas-tight galvanic cell which includes a lid member provided with a pole lead-through and a bottom member which houses an electrode assembly. The pole lead-through includes a rivet and a sealing ring. The rivet includes a shaft which extends through the lid and a plate-shaped rivet head located adjacent the inner surface of the lid member. A sealing ring is interposed between the plate-shaped rivet head and the inner wall of the lid thereby to form a seal for the interior of the cell.

The Zupancic U.S. Pat. No. 4,329,405 discloses an electrochemical cell having a safety blow-out vent closure for galvanic cells which includes a deformable ball member which is force-fitted into a vent orifice in a cell housing. The deformable ball member is adapted to be at least partially ejected from the vent orifice upon the build up of a predetermined internal gas pressure within the cell. A ram member is used to force the deformable ball member into the vent orifice and is thereafter removed and a layer of a sealant is disposed over the ball and cover of the cell housing in order to provide a sealed cell having a safety vent closure.

As will be described in greater detail hereinafter, the method for closing and sealing an opening in a container and the sealed closure formed thereby of the present invention differ from the various closure methods and assemblies previously proposed by providing a first plug member and a second plug member which are adapted to provide a double fluid tight seal in a countersunk opening in a wall of a container for an electrolytic cell to prevent leakage of electrolyte from the container. The first plug member is a stainless steel ball which is press-fitted into the opening in a fluid tight manner in order to establish a first fluid tight seal. The second plug member is fixed in the counterbore above the first plug member and the opening with a laser weld in order to establish a second fluid tight seal.

SUMMARY OF THE INVENTION

According to the present invention, there is provided a fluid tight closrue assembly for closing and sealing an opening in a wall of a container for an electrolytic cell having liquid therin, said closure assembly comprising: a first plug member inserted into said opening in a fluid tight manner to establish a first seal, said opening being provided with a counterbore; and a second plug member which is inserted into said counterbore above said first plug member and said opening, which is permanently fixed to a wall of said counterbore radially outwardly of said opening so that a fluid tight second seal is formed between said second plug member and said wall thereby to provide a double seal for preventing leakage of liquid from said container through said opening, and which forms a terminal for said electrolytic cell.

BRIEF DESCRIPTION OF THE DRAWINGS

FIG. 1 is a vertical sectional view of an electrochemical cell with a portion broken away and shows a fluid tight plug assembly constructed in accordance with the teachings of the present invention.

FIG. 2 is a top view of the fluid tight plug assembly taken along line 2—2 of FIG. 1.

FIG. 3 is an exploded view of the fluid tight plug assembly constructed in accordance with the teachings of the present invention.

BRIEF DESCRIPTION OF THE PREFERRED EMBODIMENT

Referring to FIG. 1, there is illustrated therein, an electrochemical cell or battery cell 10 having a fluid tight closure assembly 12 constructed according to the teachings of the present invention.

The electrochemical cell 10 includes a cell housing 14 including an outer conductive case 16 which is fabricated from an electrically conductive material such as stainless steel and a lid member 18, which is also fabricated from stainless steel, preferably 304L stainless steel, and which is welded or otherwise permanently fixed to the upper end 20 of the outer conductive case 16 to provide a hermetically sealed housing 14.

A glass-to-metal seal 22 extends through an opening 24 in the lid member 18 and includes an anode lead terminal 26 extending therethrough which is insulated from the lid member 18.

The electrochemical cell 10 further includes an electrolyte storage area or reservoir 28 which is defined below an inner surface 30 of the lid member 18 and above a cathode material 32, an insulative separator 34 and an anode material. The separator 34 insulates an anode material 36 from the cathode material 32.

According to the teachings of the present invention, the closure assembly 12 includes a first plug member 40 and a second plug member 42 which, when fixed in place in an opening or backfill hole 44 provides a double seal in a fluid tight manner in the lid member 18 of the cell housing 14 after an electrolyte, such as lithium thionyl chloride, has been poured through the backfill hole 44 into the electrolyte reservoir 28.

The first plug member 40 is a metal ball made of an electrically conductive material, preferably 302L stainless steel, which is capable of being deformed when sufficient pressure is exerted thereon. The first plug member or sealing ball 40, has a diameter which is somewhat larger than the diameter of the backfill hole 44 in the lid member 18. More particularly, the diameter of the sealing ball 40 is preferably approximately 0.040 inch, and the diameter of the backfill hole 44 is preferably approximately 0.035 inch. Accordingly, when the sealing ball 40 is press-fitted into the backfill hole 44, the sealing ball 40 conforms to the diameter of the backfill hole 44 thereby to provide a first fluid tight seal to the backfill hole 44 in order to prevent leakage of the electrolyte from the reservoir 28 through the backfill hole 44 and out of the battery cell housing 14.

Referring now to FIG. 3, the backfill hole 44 is provided with a counterbore 46 in the upper surface or wall 47 of the lid member 18 and around the backfill hole 44. The counterbore has a diameter of approximately 0.156 inch. The second plug member 42 is made of an electrically conductive material, preferably either nickel 200 or 304L stainless steel plated with nickel 200. The second plug member 42 has an inverted mushroom or inverted top shape with an inverted T-shape cross-section. A circular base portion 48 of the second plug member 42 is inserted into the counterbore 46 over the backfill hole 44 and over the sealing ball 40.

The second plug member 42 defines a positive lead terminal for the electrochemical cell 10 and comprises not only the circular base portion 48, but also a centrally located pin or stud portion 50 which is perpendicular to the base portion 48 and upstanding therefrom. The base portion 48 has a diameter which is almost equal to the diameter of the counterbore 46, preferably 0.155 inch, and a thickness which is equal to the depth of the counterbore 46, preferably 0.010 inch. Accordingly, with these dimensions, the upper surface 52 of the base portion 48 is generally flush or in the same plane with the upper surface or wall 47 of the lid member 18 after the second plug member 42 is inserted into the counterbore 46. Once the second plug member 42 is inserted into the counterbore 46, the pin or stud portion 50, having a diameter of approximately 0.030 inch and a height of approximately 0.055 inch, upstands from the base portion 48 and above the wall 47 of the lid member 18, and is adapted to be electrically connected to a device which is operated by the electrical current generated by the electrochemical cell 10.

It is to be appreciated with in accordance with the teachings of the present invention, after the electrolyte is poured through the backfill hole 44 and into the electrolyte reservoir 28, the first plug member or sealing ball 40 is press-fitted into the backfill hole 44 in order to establish the first fluid tight seal to the backfill hole 44. Excess electrolyte is then washed with water from the upper surface or wall 47 from the counterbore 46 and the top of ball 40. Then the second plug member 42 is inserted into the counterbore 46. Next an upper circumferential edge 54 of the base portion 48 of the second plug member 42 is permanently fixed to an adjacent circumferential edge 56 of the counterbore 46 by a laser beam thereby to form a sealing weldment or bead 58 (FIG. 2) defining the second seal. In this way, the closure assembly 12 of the present invention establishes a double fluid tight seal to prevent the leakage of electrolyte from the reservoir 28 through the backfill hole 44.

It is apparent that one of the advantages of the plug assembly 12 of the present invention is that two separate and distinct electrolyte leakage barriers or seals are provided by the first and second plug members 40 and 42 which thereby permit the laser welded area 58 between the base portion 48 of the second plug member 42 and the lid member 18 to have a reduced rejection rate after the final weld.

From the foregoing description, it will be apparent that the method for closing and sealing a backfill hole 44 in a lid member 18 of an electrochemical cell 10 and the closure assembly 12 formed thereby of the present invention have a number of advantages, some of which have been described above and others of which are inherent in the invention.

Also, it will be apparent that modifications can be made to the method and the assembly 12 of the present invention without departing from the teachings of the present invention.

Accordingly, the scope of the invention is only to be limited as necessitated by the accompanying claims.

I claim:

1. A closure assembly for closing and sealing an opening in a wall of a container for an electrolytic cell having liquid therein, said closure assembly comprising: a first plug member inserted into said opening in a fluid tight manner to establish a first seal, said opening being provided with a counterbore; and a second plug member which is inserted into said counterbore above said first plug member and said opening, which is permanently fixed to a wall of said counterbore radially outwardly of said opening so that a fluid tight second seal is formed between said second plug member and said wall thereby to provide a double seal for preventing leakage of liquid from said container through said opening, and which forms a terminal for said electrolytic cell.

2. The assembly of claim 1 wherein said container is a battery cell housing having an open end and said wall is a lid member which is welded or otherwise attached to said battery cell housing over said open end.

3. The assembly of claim 1 wherein said fluid material is an electrolyte that is stored in said battery cell housing.

4. The assembly of claim 1 wherein said first plug member is a metal ball having a diameter slightly greater than the diameter of said opening and said metal ball is press-fitted into said opening.

5. The assembly of claim 4 wherein said diameter of said metal ball is approximately 0.040 inch.

6. The assembly of claim 4 wherein said diameter of said opening is approximately 0.035 inch.

7. The assembly of claim 3 wherein said second plug member is an inverted top shaped member having an inverted T-shape cross-section and comprises a circular base portion and a centrally located pin or stud which is perpendicular to said base portion.

8. The assembly of claim 7 wherein said base portion has a thickness approximately equal to the depth of said counterbore in said wall so that an upper surface of said base portion is generally flush with an upper surface of said wall and said pin or stud extends upwardly from said base portion and said wall to form a terminal pin defining a positive terminal for a battery cell.

9. The assembly of claim 7 wherein the diameter of said base portion is almost equal to the diameter of said counterbore in said wall.

10. The assembly of claim 9 wherein the diameter of said base portion is approximately 0.155 inch.

11. The assembly of claim 9 wherein the diameter of said counterbore is approximately 0.156 inch.

12. The assembly of claim 8 wherein the thickness of said base portion is approximately 0.010 inch.

13. The assembly of claim 8 wherein the depth of said counterbore is approximately 0.010 inch.

14. The assembly of claim 7 wherein the height of said pin is approximately 0.055 inch.

15. The assembly of claim 7 wherein the diameter of said pin is approximately 0.030 inch.

16. The assembly of claim 7 wherein the height of said metal stud is approximately 0.065 inch.

17. The assembly of claim 1 wherein said wall is a lid member made of 302L stainless steel and is approximately 0.050 inch thick.

18. The assembly of claim 3 wherein the electrolyte is lithium thionyl chloride.

19. The assembly of claim 4 wherein said metal ball is made of 302L stainless steel.

20. The assembly of claim 7 wherein said second plug member is made of nickel 200.

21. The assembly of claim 7 wherein said second plug member is made of 304L stainless steel plated with nickel 200.

22. The assembly of claim 7 wherein said second plug member defines a positive lead terminal for a battery cell.

23. The assembly of claim 1 wherein said second plug member is sealed and fixed to said wall by welding a seam around said counterbore between said counterbore and said second plug member.

24. The assembly of claim 7 wherein the circumferential edge of said base portion is laser welded to the circumferential edge of said counterbore.

* * * * *